United States Patent
Park et al.

(10) Patent No.: US 10,956,159 B2
(45) Date of Patent: Mar. 23, 2021

(54) METHOD AND PROCESSOR FOR IMPLEMENTING AN INSTRUCTION INCLUDING ENCODING A STOPBIT IN THE INSTRUCTION TO INDICATE WHETHER THE INSTRUCTION IS EXECUTABLE IN PARALLEL WITH A CURRENT INSTRUCTION, AND RECORDING MEDIUM THEREFOR

(71) Applicant: SAMSUNG ELECTRONICS CO., LTD., Suwon-si (KR)

(72) Inventors: Jae-Un Park, Seoul (KR); Suk-Jin Kim, Seoul (KR); Do-Hyung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 14/554,785

(22) Filed: Nov. 26, 2014

(65) Prior Publication Data
US 2015/0154026 A1 Jun. 4, 2015

(30) Foreign Application Priority Data
Nov. 29, 2013 (KR) .................. 10-2013-0147519

(51) Int. Cl.
*G06F 9/30* (2018.01)
*G06F 9/38* (2018.01)

(52) U.S. Cl.
CPC ........ *G06F 9/30145* (2013.01); *G06F 9/3016* (2013.01); *G06F 9/30156* (2013.01); *G06F 9/3822* (2013.01); *G06F 9/3838* (2013.01); *G06F 9/3853* (2013.01)

(58) Field of Classification Search
CPC .................................................. G06F 9/30156
See application file for complete search history.

(56) References Cited

U.S. PATENT DOCUMENTS 5,819,058 A * 10/1998 Miller ................. G06F 9/30156
712/210
6,185,670 B1 * 2/2001 Huff ..................... G06F 9/30021
708/209

(Continued)

FOREIGN PATENT DOCUMENTS

| CN | 101501634 A | 8/2009 |
|---|---|---|
| EP | 1 220 091 A2 | 7/2002 |
| KR | 1998-018065 | 6/1998 |

OTHER PUBLICATIONS

PCT International Search Report dated Mar. 6, 2015 in corresponding International Patent Application No. PCT/KR2014/011298.

(Continued)

*Primary Examiner* — Jacob Petranek
(74) *Attorney, Agent, or Firm* — Staas & Halsey LLP

(57) ABSTRACT

In a method to execute instructions, at least one instruction executed in a predetermined cycle is acquired based on information included in each of a plurality of instructions, and a code included in the at least one instruction acquired. An instruction is allocated to at least one slot based on the analysis result, and a slot necessary to execute the instruction is selectively used. Accordingly, power consumption of a device using the method may be reduced.

9 Claims, 9 Drawing Sheets

(56) References Cited

U.S. PATENT DOCUMENTS

| | | | | |
|---|---|---|---|---|
| 6,711,670 B1* | 3/2004 | Soltis, Jr. | ............... | G06F 9/3838 712/215 |
| 6,983,389 B1* | 1/2006 | Filippo | ................. | G06F 9/3836 713/324 |
| 7,062,634 B1* | 6/2006 | Southwell | ........... | G06F 9/30156 712/210 |
| 7,281,119 B1* | 10/2007 | Cofler | .................... | G06F 9/3836 712/216 |
| 8,190,854 B2 | 5/2012 | Codrescu et al. | | |
| 2002/0112193 A1 | 8/2002 | Altman et al. | | |
| 2002/0144098 A1* | 10/2002 | Wang | .................. | G06F 9/30072 712/221 |
| 2003/0188132 A1* | 10/2003 | Keltcher | ............. | G06F 9/30101 712/215 |
| 2004/0073773 A1 | 4/2004 | Demjanenko | | |
| 2005/0071701 A1* | 3/2005 | Luick | ....................... | G06F 1/206 713/320 |
| 2005/0251644 A1* | 11/2005 | Maher | .................... | G06F 9/3012 712/2 |
| 2007/0038848 A1* | 2/2007 | Gschwind | ........... | G06F 9/30101 712/225 |
| 2007/0233961 A1 | 10/2007 | Banning et al. | | |
| 2008/0294871 A1 | 11/2008 | Pappalardo et al. | | |
| 2010/0118852 A1 | 5/2010 | Codrescu et al. | | |
| 2010/0185835 A1 | 7/2010 | Leijten et al. | | |
| 2010/0186006 A1* | 7/2010 | Bougard | ............. | G06F 15/7867 717/155 |
| 2011/0087841 A1 | 4/2011 | Toh et al. | | |

OTHER PUBLICATIONS

Chinese Office Action dated Dec. 5, 2017 in corresponding Chinese Application No. 201480074517.3.

Extended European Search Report dated Oct. 20, 2017 in corresponding European Patent Application No. 14865605.1.

Korean Office Action dated Feb. 19, 2020 from Korean Application No. 10-2013-0147519, 11 pages.

\* cited by examiner

FIG. 7

| Instruction Queue Output | | | | Stop Bit | | | | Slot Valid | | | |
|---|---|---|---|---|---|---|---|---|---|---|---|
| 0 | 1 | 2 | 3 | Bit0 | Bit1 | Bit2 | Bit3 | Slot0 | Slot1 | Slot2 | Slot3 |
| Scalar | Scalar | Vector | Vector | 0 | 0 | 0 | 1 | 1 | 1 | 1 | 1 |
| Scalar | Scalar | Vector | X | 0 | 0 | 1 | X | 1 | 1 | 1 | 0 |
| Scalar | Scalar | X | X | 0 | 1 | X | X | 1 | 1 | 0 | 0 |
| Scalar | Vector | Vector | X | 0 | 0 | 1 | X | 1 | 0 | 1 | 1 |
| Scalar | Vector | X | X | 0 | 1 | X | X | 1 | 0 | 1 | 0 |
| Scalar | X | X | X | 1 | X | X | X | 1 | 0 | 0 | 0 |
| Vector | Vector | X | X | 0 | 1 | X | X | 0 | 0 | 1 | 1 |
| Vector | X | X | X | 1 | X | X | X | 0 | 0 | 1 | 0 |

METHOD AND PROCESSOR FOR IMPLEMENTING AN INSTRUCTION INCLUDING ENCODING A STOPBIT IN THE INSTRUCTION TO INDICATE WHETHER THE INSTRUCTION IS EXECUTABLE IN PARALLEL WITH A CURRENT INSTRUCTION, AND RECORDING MEDIUM THEREFOR

CROSS-REFERENCE TO RELATED APPLICATIONS

This application claims the benefit of Korean Patent Application No. 10-2013-0147519, filed on Nov. 29, 2013, in the Korean Intellectual Property Office, the disclosure of which is incorporated herein in its entirety by reference.

BACKGROUND

1. Field

One or more embodiments of the present invention relate to methods and processors for executing instructions, methods and apparatuses for encoding instructions, and recording media therefor.

2. Description of the Related Art

The power efficiency of processor-based devices has become more important, and in particular, the power efficiency of battery-operated devices has become a core problem that requires higher consideration. Thus, research has been conducted to increase the power efficiency such devices.

Examples of methods of increasing the power efficiency of various devices include a method of designing a separate circuit device to use lower power and a method of designing a processor to manage power consumption.

However, when a separate circuit device is designed and implemented, additional power consumption occurs due to the use of additional hardware. Also, when a separate instruction is added to design a process in order to manage power consumption, the overall size of instructions to be processed increases.

SUMMARY

One or more embodiments of the present invention include methods and processors for executing instructions, methods and apparatuses for encoding an instruction, and recording media therefor.

Additional aspects will be set forth in part in the description which follows and, in part, will be apparent from the description, or may be learned by practice of the presented embodiments.

According to one or more embodiments of the present invention, a method to execute instructions in a processor includes: acquiring, based on a stop bit included in each of a plurality of instructions, at least one instruction executed in a predetermined cycle; extracting from the at least one instruction a type code including type information of an operation performed based on the at least one instruction; allocating the at least one instruction to at least one slot of a first multiplexer, based on the extracted type code; and performing the operation in the allocated slot.

The acquiring of the at least one instruction may include: acquiring a second instruction, which is a next instruction following a first instruction, in the predetermined cycle when a stop bit included in the first instruction has a first value; and acquiring the second instruction in a next cycle following the predetermined cycle when the stop bit included in the first instruction has a second value.

The performing of the operation may include: supplying power to the allocated slot in the at least one slot of the first multiplexer; and interrupting power supplied to all but the allocated slot in the at least one slot of the first multiplexer.

The performing of the operation may include: selecting a register for acquiring an operand among at least one register based on the type information of the operand; and acquiring the operand from the selected register.

The selecting of the register may include: supplying power to a slot of a second multiplexer that connects the selected register and the allocated slot of the first multiplexer; and interrupting power supplied to a slot of a third multiplexer that connects an unselected register among the at least one register and the allocated slot of the first multiplexer.

According to one or more embodiments of the present invention, a method for encoding instructions in a device includes: generating a type code including type information of a predetermined operation performable in a processor and type information of an operand processed in the predetermined operation; generating a stop bit including information about at least one operation performed in a predetermined cycle; and generating an instruction for performing the predetermined operation based on the type code and the stop bit.

The generating of the stop bit may include: representing a first value in the stop bit when a second instruction, which is a next instruction following a first instruction, is executed in the predetermined cycle; and representing a second value in the stop bit when the second instruction is executed in a next cycle following the predetermined cycle.

According to one or more embodiments of the present invention, a processor to execute instructions includes: an input unit configured to acquire, based on a stop bit included in each of a plurality of instructions, at least one instruction executed in a predetermined cycle; a control unit configured to extract a type code including type information of an operation performed based on the at least one instruction, from the at least one instruction, and allocate the at least one instruction to at least one slot of a first multiplexer, based on the extracted type code; and an operation unit configured to perform the operation in the allocated slot.

The input unit may acquire a second instruction, which is a next instruction following a first instruction, in the predetermined cycle when a stop bit included in the first instruction has a first value, and may acquire the second instruction in a next cycle following the predetermined cycle when the stop bit included in the first instruction has a second value.

The operation unit may supply power to the allocated slot in the at least one slot of the first multiplexer, and interrupt power supplied to all but the allocated slot in the at least one slot of the first multiplexer.

The operation unit may select a register for acquiring an operand among at least one register based on the type information of the operand, and acquire the operand from the selected register.

The operation unit may supply power to a slot of a second multiplexer that connects the selected register and the allocated slot of the first multiplexer, and interrupt power supplied to a slot of a third multiplexer that connects an unselected register among the at least one register and the allocated slot of the first multiplexer.

The operation unit may select an operation performing unit performing the operation among at least one operation performing unit connected to the allocated slot of the first multiplexer, and may perform the operation in the selected operation performing unit based on the acquired operand.

According to one or more embodiments of the present invention, an apparatus to execute instructions includes: a code generating unit configured to generate a type code including type information of a predetermined operation performable in a processor and type information of an operand processed in the predetermined operation; a stop bit generating unit configured to generate a stop bit including information about at least one operation performed in a predetermined cycle; and an instruction generating unit configured to generate an instruction for performing the predetermined operation based on the type code and the stop bit.

The stop bit generating unit may represent a first value in the stop bit when a second instruction, which is a next instruction following a first instruction, is executed in the predetermined cycle, and may represent a second value in the stop bit when the second instruction is executed in a next cycle following the predetermined cycle.

BRIEF DESCRIPTION OF THE DRAWINGS

These and/or other aspects will become apparent and more readily appreciated from the following description of the embodiments, taken in conjunction with the accompanying drawings in which:

FIG. 7 is a table illustrating a method for allocating an instruction to at least one slot included in a first multiplexer according to an embodiment of the present invention;

DETAILED DESCRIPTION

Figure 1:
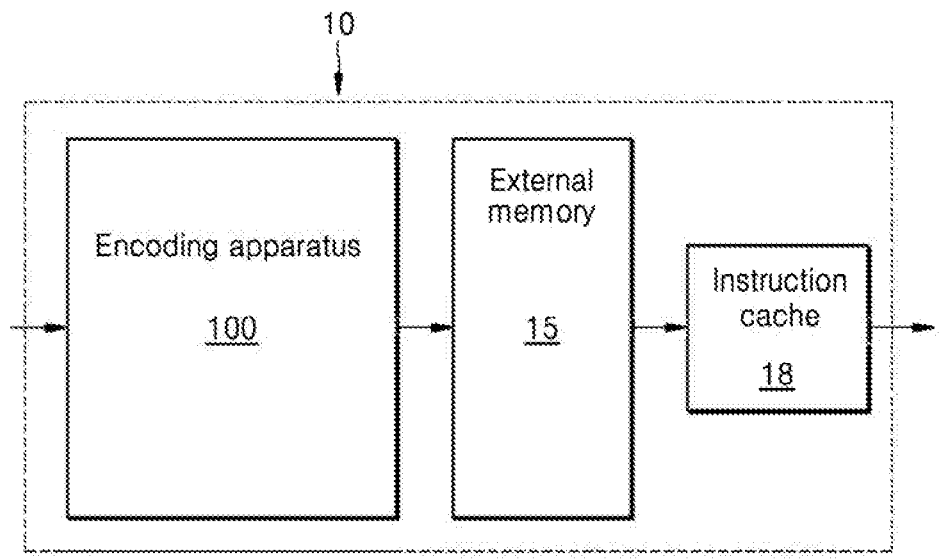
FIG. 1 is a block diagram of an instruction memory system according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Embodiments of the present invention will be described below in detail with reference to the accompanying drawings so that those of ordinary skill in the art may easily implement the embodiments of the present invention. In this regard, the present embodiments may have different forms and should not be construed as being limited to the descriptions set forth herein. In addition, portions irrelevant to the description of the embodiments of the present invention will be omitted in the drawings for a clear description of the embodiments of the present invention, and like reference numerals will denote like elements throughout the specification.

It will be understood that when an element is referred to as being "connected" to another element, it may be directly connected to the other element or may be electrically connected to the other element with other element(s) interposed therebetween. It will also be understood that the terms "comprises", "includes", and "has", when used herein, specify the presence of stated elements, but do not preclude the presence or addition of other elements, unless otherwise defined.

Hereinafter, embodiments of the present invention will be described in detail with reference to the accompanying drawings.

FIG. 1 is a block diagram of an instruction memory system 10 according to an embodiment of the present invention.

In the instruction memory system 10 of FIG. 1, only components related to the present embodiment are illustrated. Therefore, those or ordinary skill in the art will understand that the instruction memory system 10 may further include other general-purpose components in addition to the components illustrated in FIG. 1.

Referring to FIG. 1, the instruction memory system 10 may include an instruction encoding apparatus 100, an external memory 15, and an instruction cache 18.

The instruction memory system 10 may generate an instruction based on encoding information for defining an instruction stored in the external memory 15. Herein, the instruction encoding apparatus 100 may be a compiler. However, this is merely an embodiment of the present invention, and the instruction encoding apparatus 100 may be any device that may generate an instruction according to an embodiment of the present invention.

According to an embodiment of the present invention, the instruction encoding apparatus 100 may generate an instruction to be executed in a very long instruction word (VLIW) processor based on encoding information. VLIW is one of the devices for performing an operation to execute a plurality of instructions simultaneously. The instruction encoding apparatus 100 according to an embodiment of the present invention may generate an instruction based on a predetermined condition and encoding information acquired from the external memory 15. For example, when the instruction encoding apparatus 100 generates a plurality of instructions that are simultaneously performed in a VLIW processor, a condition may be set such that an instruction to perform a scalar operation (hereinafter, referred to as a scalar instruction) has to be generated before an instruction to perform a vector operation (hereinafter, referred to as a vector instruction). That is, when one scalar operation and two vector operations have to be performed in a current first cycle, the instruction encoding apparatus 100 may generate a plurality of instructions in the order of a scalar instruction, a first vector instruction, and a second vector instruction.

When the instruction encoding apparatus 100 generates an instruction based on a predetermined condition, a plurality of slots for simultaneously executing a plurality of instructions in a processor may be efficiently designed. This will be described later in detail with reference to FIG. 8.

The external memory 15 may store encoding information for defining an instruction according to an embodiment of the present invention. The instruction may include, for example, an operation code, an address code of an operand processed based on the operation code, or an address code of a result value that stores an operation result. Detailed information included in the instruction, for example, a code performing a predetermined function, may vary according to an operation performed according to the instruction.

A structure of an instruction according to an embodiment of the present invention may further include a type code and a stop bit, in addition to the operation code, the address of the operand, and the address code of the result value.

The type code may include type information of an operation performed based on the instruction. Herein, the type of the operation may include a scalar operation or a vector operation. Also, the type code may include type information of an operand performed based on the instruction. Herein, the type of the operand may include scalar data or vector data.

At least one code or bit included in the instruction may be arranged according to a predetermined structure of the instruction. Hereinafter, for example, it is assumed that the stop bit is disposed at the first bit among a plurality of bits constituting the instruction, and the type code is disposed at the last bit thereof. However, this is merely an embodiment of the present invention, and embodiments of the present invention are not limited thereto.

Figure 2:
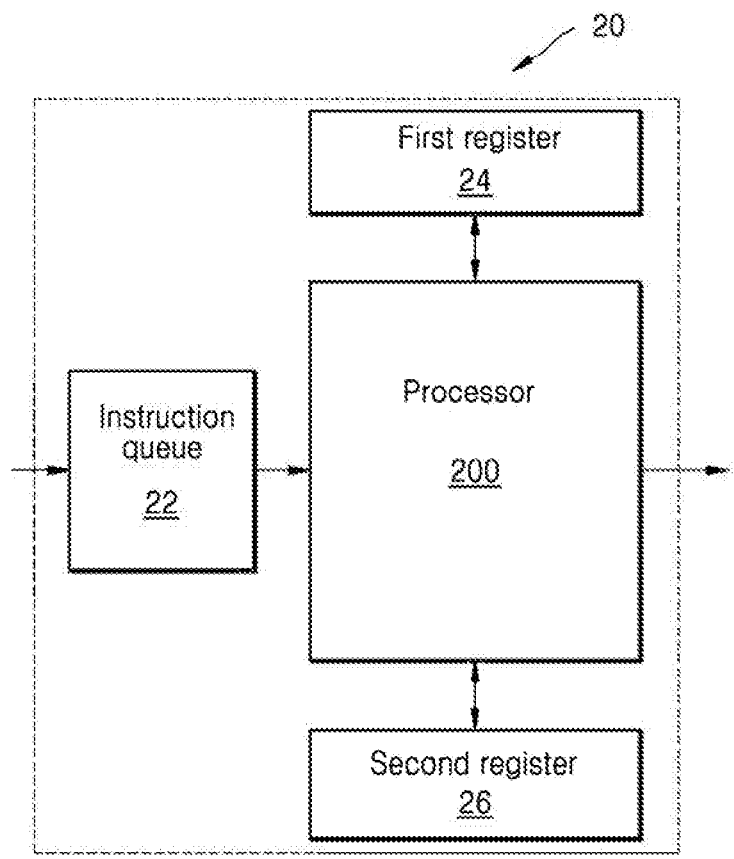
FIG. 2 is a block diagram of a system for executing instructions according to an embodiment of the present invention.

FIG. 2 is a block diagram of a system 20 for executing an instruction according to an embodiment of the present invention.

In the system 20 of FIG. 2, only components related to the present embodiment are illustrated. Therefore, those or ordinary skill in the art will understand that the system 20 may further include other general-purpose components in addition to the components illustrated in FIG. 2.

Referring to FIG. 2, the system 20 may include an instruction queue 22, a first register 24, a second register 26, and a processor 200.

The instruction queue 22 may include a plurality of instructions that are executable in the processor 200. According to an embodiment of the present invention, the instruction queue 22 may receive an instruction from the instruction cache 18 of the instruction memory system 10 illustrated in FIG. 1. According to another embodiment, the instruction queue 22 may acquire an instruction stored in an external device.

Instructions may be stored in the instruction queue 22 based on the order of instructions generated by the instruction encoding apparatus 100. For example, when the instruction encoding apparatus 100 generates a plurality of instructions in the order of a scalar instruction, a first vector instruction, and a second vector instruction, a plurality of instructions may be stored in the instruction queue 22 in the order of a scalar instruction, a first vector instruction, and a second vector instruction.

The instruction queue 22 may simultaneously output a predetermined number of instructions. For example, when the predetermined number is 4, the instruction queue 22 may simultaneously output a first scalar instruction, a second scalar instruction, a first vector instruction, and a second vector instruction.

The processor 200 may acquire at least one instruction, which is to be executed in a predetermined cycle, from among a plurality of instructions output from the instruction queue 22. The processor 200 according to an embodiment of the present invention may determine at least one instruction, which is to be executed in a predetermined cycle, based on a stop bit included in each of a plurality of instructions output from the instruction queue 22.

Also, the processor 200 may perform an operation based on the instruction that is to be executed in the predetermined cycle. The processor 200 may perform an operation by analyzing an operation code, an address code of an operand, and an address code of a result value that are included in the instruction.

The processor 200 according to an embodiment of the present invention may determine a slot for executing the instruction based on the type code included in the instruction. For example, the processor 200 may acquire an instruction from the instruction queue 22 through the determined slot. Herein, a first multiplexer included in the processor 200 may include at least one slot for acquiring at least one instruction from the instruction queue 22.

The slot determined by the processor 200 may include at least one multiplexer that connects a predetermined register storing an operand processed based on the instruction and a slot of the first multiplexer. In the following description, it is assumed that the processor 200 includes a second multiplexer and a third multiplexer.

The first register 24 and the second register 26 may store an operand that is processed based on the instruction acquired by the processor 200. Address information of the register storing the operand may be stored in the processor 200.

The first register 24 and the second register 26 may be classified as a vector register and a scalar register according to the type of an operand stored in each of the first register 24 and the second register 26. For example, when scalar data is stored in the first register 24, the first register 24 may be a scalar register. Also, when vector data is stored in the second register 26, the second register 26 may be a vector register.

Figure 3:
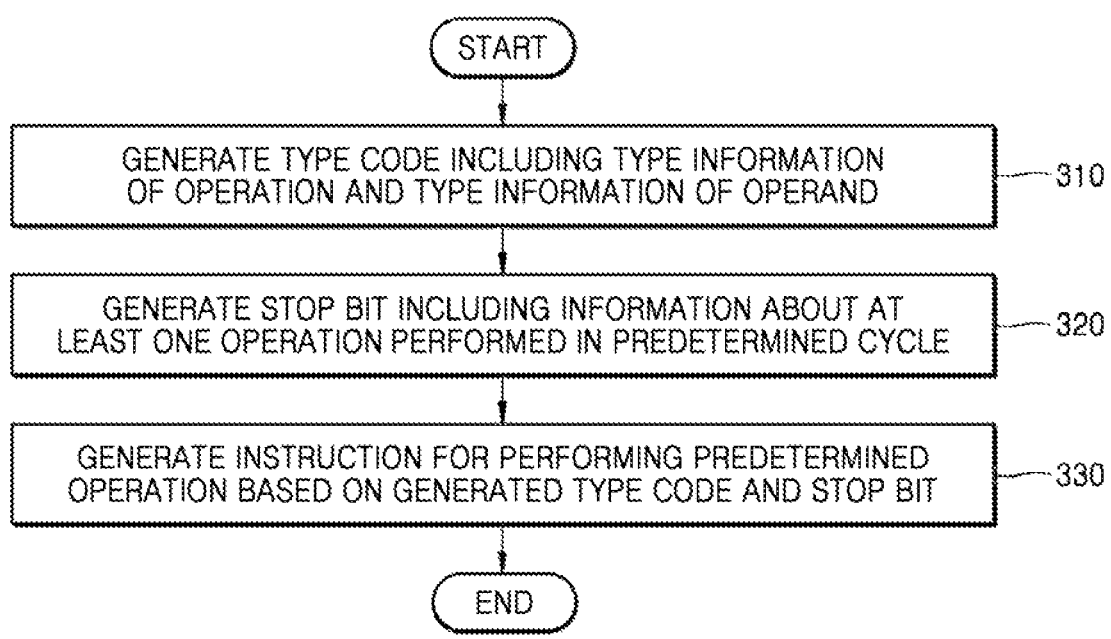
FIG. 3 is a flowchart illustrating a method for encoding instructions according to an embodiment of the present invention.

FIG. 3 is a flowchart illustrating a method for encoding an instruction according to an embodiment of the present invention.

In operation 310, the instruction encoding apparatus 100 may generate a type code including type information of a predetermined operation and type information of an operand. Herein, the type of the operation may include a scalar operation or a vector operation. Also, the type of the operand may include scalar data or vector data.

An instruction according to an embodiment of the present invention may include 32 bits, for example. Information about the type of the operation may be represented by the 32nd bit of the 32-bit instruction. For example, when the operation performed by the instruction is a scalar operation, the 32nd bit may be 0. Also, when the operation performed by the instruction is a vector operation, the 32nd bit may be 1. However, this is merely an embodiment of the present invention, and the information about the type of the operation is not limited to being represented in the 32nd bit. For example, the information about the type of the operation may be represented in two or more bits, and the information about the type of the operation may be represented in a bit other than the 32nd bit. Also, a bit indicating a scalar operation may be represented as 1, and a bit indicating a vector operation may be represented as 0, for example.

According to an embodiment of the present invention, information about the type of the operand may be represented by a predetermined number of bits of the 32-bit instruction. When the operation performed by the instruction is a scalar operation, the operand may be scalar data. When the operation performed by the instruction is a vector operation, the operand may include only vector data or may include both vector data and scalar data.

In the case of a scalar operation, since the operand is scalar data, the type of the operand may not be represented by additionally using a bit other than the 32nd bit indicating a scalar operation. In the case of a vector operation, when the operand includes only vector data, the 27th bit may be represented as 0, for example. Also, in the case of a vector operation, when the operand includes both vector data and scalar data, the 27th bit may be represented as 1.

In operation 320, the instruction encoding apparatus 100 may generate a stop bit including information about at least one operation performed in a predetermined cycle. The stop bit may be used to determine at least one operation, which is to be performed in a predetermined cycle, from among a plurality of operations.

For example, in an embodiment, the maximum number of instructions that are simultaneously executable in the VLIW processor may be 4. When the stop bit included in each of four instructions is, for example, 0011, three operations may be performed in a predetermined cycle. According to an embodiment of the present invention, when the stop bit has a first value, for example, 0, a next operation following a predetermined operation may be performed in a predetermined cycle. On the other hand, when the stop bit has a second value, for example, 1, a next operation following a predetermined operation may be performed in a next cycle following a predetermined cycle.

The instruction encoding apparatus 100 according to an embodiment of the present invention may represent the stop bit in the first bit among a plurality of bits constituting the instruction. However, this is merely an embodiment of the present invention, and embodiments of the present invention are not limited thereto.

In operation 330, the instruction encoding apparatus 100 may generate an instruction for performing a predetermined operation based on the generated type code and stop bit.

The instruction encoding apparatus 100 may generate an instruction by disposing the type code and the stop bit according to a predetermined structure of the instruction. Herein, the instruction may include an operation code, an address code of an operand processed based on the operation code, and an address code of a result value that stores an operation result. Detailed information included in the instruction, for example, a code performing a predetermined function, may vary according to an operation performed by the instruction.

Figure 4:
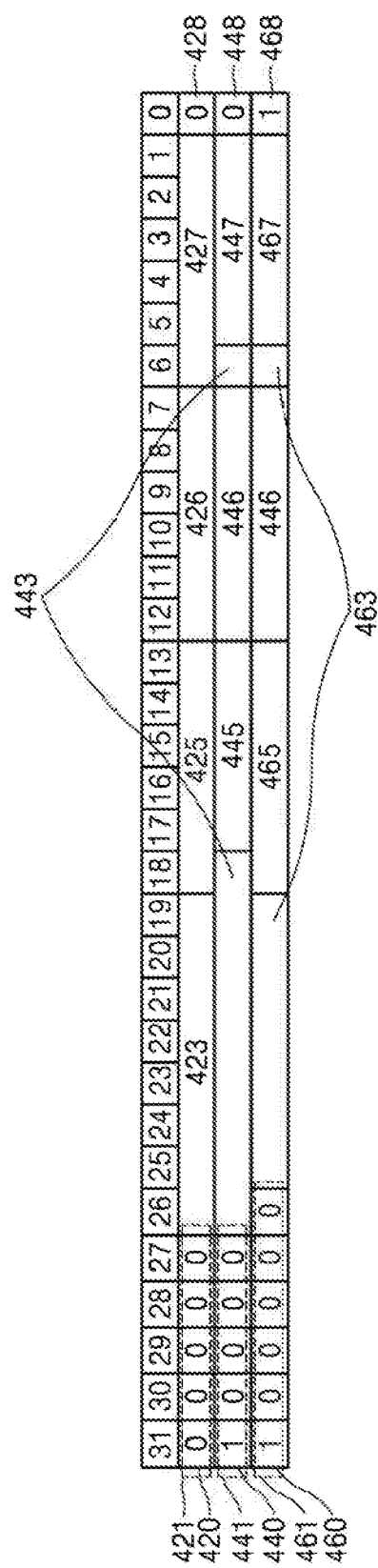
FIG. 4 is a diagram illustrating a structure of an instruction generated according to an embodiment of the present invention.

FIG. 4 is a diagram illustrating a structure of an instruction generated according to an embodiment of the present invention.

Referring to FIG. 4, in an embodiment, an (n−1)th instruction 420, an (n)th instruction 440, and an (n+1)th instruction 460 are illustrated in FIG. 4. Herein, the (n−1)th instruction 420, the (n)th instruction 440, the (n+1)th instruction 460, and an (n+2)th instruction (not illustrated) may be output from the instruction queue 22 (see FIG. 2) in the same cycle.

An instruction according to an embodiment of the present invention may include 32 bits, for example. Based on a predetermined structure of the instruction, a value of a stop bit may be represented in bit 0 (first bit) among 32 bits. A type code including information about a type of an operation and information about a type of an operand may be represented in a plurality of bits, for example, bit 31 (32nd bit) to bit 26 (27th bit) or bit 31 to bit 27 (28th bit). In detail, type information of an operation performed based on the instruction may be represented in bit 31. Herein, the operation is a scalar operation when the value of bit 31 is 0, and the operation is a vector operation when the value of bit 31 is 1. Also, type information of an operand may be represented in a plurality of bits, for example, bit 30 (31st bit) to bit 27 (28th bit) or bit 30 to bit 26 (27th bit). The type information of the operand will be described in detail with reference to a structure of each instruction.

Referring to FIG. 4, in an embodiment, a type code 421 may be represented in a plurality of bits, for example, bit 31 to bit 27 (28th bit) of the (n−1)th instruction 420. In FIG. 4, the value of bit 31 of the (n−1)th instruction 420 is 0. When the value of bit 31 is 0, an operation performed based on the (n−1)th instruction 420 may be a scalar operation. The value of bit 30 to bit 27 of the (n−1)th instruction 420 is 0. In the case of a scalar operation, an operand is always scalar data. In the case of a scalar operation, information for identifying a type of an operand may not be separately set. However, this is merely an embodiment of the present invention, the value of bit 30 to bit 27 in the (n−1)th instruction 420 may be set as 0 to indicate that the operand is scalar data.

An operation code 423 may be represented in bit 26 to bit 19 (20th bit) of the (n−1)th instruction 420. Also, addresses 425 and 427 of a register storing operands may be represented in bit 18 (19th bit) to bit 13 (14th bit) and bit 6 (7th bit) to bit 1 (second bit) of the (n−1)th instruction 420. An address 426 of a result value storing an operation result may be represented in bit 12 (13th bit) to bit 7 (8th bit) of the (n−1)th instruction 420.

A value of a stop bit may be represented in bit 0 (first bit 428) among 32 bits. Since 0 is represented as a value of a stop bit in bit 0 (first bit 428) of the (n−1)th instruction 420, the (n)th instruction 440, which is a next instruction following the (n−1)th instruction 420 that is a current instruction, may be acquired in a predetermined cycle of the processor 200.

A type code may be represented in a plurality of bits, for example, bit 31 to bit 27 (28th bit) of the (n)th instruction 440. For example, the value of bit 31 of the (n)th instruction 440 is 1. When the value of bit 31 is 1, a type of an operation performed based on the (n)th instruction 440 may be a vector operation. The value of bit 30 to bit 27 of the (n)th instruction 440 is 0. In the case of a vector operation, an operand may include both vector data and scalar data or may include only vector data. The value of bit 30 to bit 27 of the (n)th instruction 440 may be set as 0 to indicate that an operand includes only vector data.

An operation code may be represented in bit 26 to bit 18 (19th bit) of the (n)th instruction 440. Also, addresses of a register storing operands may be represented in bit 17 (18th bit) to bit 13 (14th bit) and bit 5 (6th bit) to bit 1 (second bit) of the (n)th instruction 440. An address 446 of a result value storing an operation result may be represented in bit 12 (13th bit) to bit 7 (8th bit) of the (n)th instruction 440.

A value of a stop bit may be represented in bit 0 (first bit 448) among 32 bits. Since 0 is represented as a value of a stop bit in bit 0 (first bit 448) of the (n)th instruction 440, the (n+1)th instruction 460, which is a next instruction following the (n)th instruction 440 that is a current instruction, may be acquired in a predetermined cycle of the processor 200.

A type code 461 may be represented in a plurality of bits, for example, bit 31 to bit 26 (27th bit) of the (n+1)th instruction 460. For example, the value of bit 31 of the (n+1)th instruction 460 is 1. When the value of bit 31 is 1, an operation performed based on the (n+1)th instruction 460 may be a vector operation. The value of bit 30 to bit 27 of the (n+1)th instruction 460 is 0. In the case of a vector operation, an operand may include both vector data and scalar data or may include only vector data. Values 0, 0, 0, 1, 0 may be represented respectively in bit 30 to bit 26 (27th bit) of the (n+1)th instruction 460 to indicate that a type of an operand includes both vector data and scalar data.

An operation code 463 may be represented in bit 25 (26th bit) to bit 19 (20th bit) of the (n+1)th instruction 460. Also, addresses 465 and 467 of a register storing operands may be represented in bit 18 (19th bit) to bit 13 (14th bit) and bit 5 (6th bit) to bit 1 (second bit) of the (n+1)th instruction 460. An address 466 of a result value storing an operation result may be represented in bit 12 to bit 7 of the (n+1)th instruction 460.

A value of a stop bit may be represented in bit 0 (first bit 468) among 32 bits. Since 1 is represented as a value of a stop bit in bit 0 (first bit 468) of the (n+1)th instruction 460, the (n+2)th instruction, which is a next instruction following the (n+1)th instruction 460 that is a current instruction, may not be acquired in a predetermined cycle of the processor 200.

Figure 5:
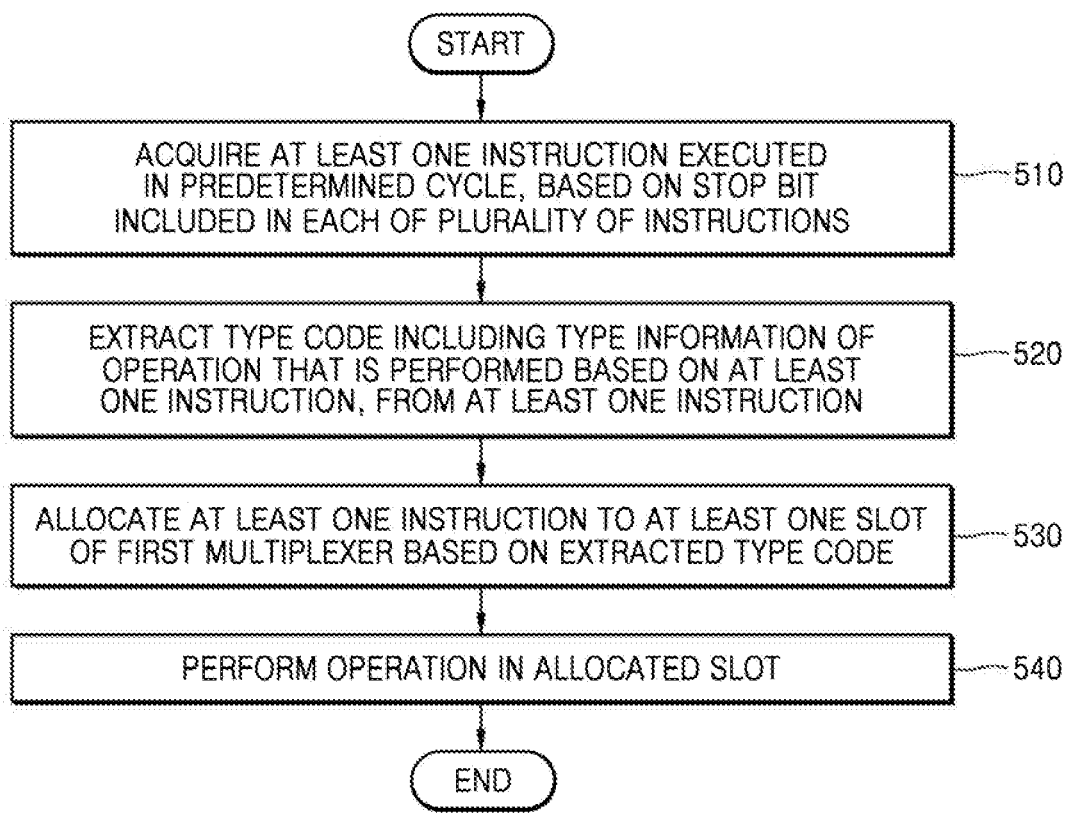
FIG. 5 is a flowchart illustrating a method for executing instructions according to an embodiment of the present invention.

FIG. 5 is a flowchart illustrating a method for executing an instruction according to an embodiment of the present invention.

In operation 510, the processor 200 may acquire at least one instruction executed in a predetermined cycle, based on a stop bit included in each of a plurality of instructions.

The processor 200 may acquire, based on a stop bit included in each of a plurality of instructions received from the instruction queue 22, at least one instruction in a predetermined cycle. Herein, the instruction queue 22 may output a predetermined number of instructions in each cycle.

When the stop bit included in the first instruction received by the processor 200 has a first value, for example, 0, the processor 200 may acquire the second instruction, which is a next instruction following the first instruction, in the predetermined cycle. Herein, the next instruction may be determined based on the order of storing a plurality of instructions in the instruction queue 22. That is, when the first instruction and the second instruction are sequentially stored in the instruction queue 22, the second instruction may be a next instruction following the first instruction.

When the stop bit included in the first instruction received by the processor 200 has a second value, for example, 1, the processor 200 may acquire the second instruction, which is a next instruction following the first instruction, in a next cycle following the predetermined cycle. That is, when the stop bit has the second value, the processor 200 may acquire the first instruction in the predetermined cycle and acquire the second instruction in the next cycle.

For example, the processor 200 may receive four instructions (that is, the (n−1)th instruction 420, the (n)th instruction 440, the (n+1)th instruction 460, and the (n+2)th instruction illustrated in FIG. 4) output from the instruction queue 22. The stop bits of the four instructions received may be respectively 0, 0, 1, and 1. After identifying that the value of the stop bit included in the (n−1)th instruction 420 received in the predetermined cycle is 0, the processor 200 may acquire the (n)th instruction 440 that is a next instruction following the (n−1)th instruction 420. After identifying that the value of the stop bit of the (n)th instruction 440 is 0, the processor 200 may acquire the (n+1)th instruction 460 that is a next instruction following the (n)th instruction 440. After identifying that the value of the stop bit of the (n+1)th instruction 460 is 1, the processor 200 may not acquire the (n+2)th instruction that is a next instruction following the (n+1)th instruction 460. The processor 200 may acquire the (n+2)th instruction in a next cycle following the predetermined cycle.

In operation 520, the processor 200 may extract a type code, which includes type information of an operation performed based on at least one instruction, from at least one instruction. Herein, the operation may be a scalar operation or a vector operation.

The processor 200 may identify operation type information included in the extracted type code. For example, in the case of an instruction representing a type of an operation by the 32nd bit, when the value of the 32nd bit is 0, the processor 200 may identify the operation type as a scalar operation. Also, when the value of the 32nd bit is 1, the processor 200 may identify the operation type as a vector operation.

In operation 530, the processor 200 may allocate at least one instruction to at least one slot of the first multiplexer based on the extracted type code. For example, when the first multiplexer includes four slots, the processor 200 may allocate a scalar instruction performing a scalar operation to the first slot and the second slot. Also, the processor 200 may allocate a vector instruction performing a vector operation to the third slot and the fourth slot.

Referring to FIG. 4, the processor 200 may acquire the (n−1)th instruction 420, the (n)th instruction 440, and the (n+1)th instruction 460. Herein, the (n−1)th instruction 420 is a scalar instruction, the (n)th instruction 440 is a vector instruction, and the (n+1)th instruction 460 is a vector instruction. The processor 200 may allocate the (n−1)th instruction 420 to the first slot of the first multiplexer. Also, the processor 200 may allocate the (n)th instruction 440 to the third slot of the first multiplexer and allocate the (n+1)th instruction 460 to the fourth slot of the first multiplexer.

In operation 540, the processor 200 may perform an operation in the allocated slot. The processor 200 may supply power to the slot that is allocated an instruction, from among at least one slot of the first multiplexer. Since instructions are allocated to the first slot, the third slot, and the fourth slot among the four slots in operation 530, the processor 200 may supply power to the first slot, the third slot, and the fourth slot.

On the other hand, the processor 200 may interrupt power supply to the slot other than the slot that is allocated an instruction, from among at least one slot of the first multiplexer. For example, since an instruction is not allocated to the second slot among the four slots in operation 530, the processor 200 may interrupt power supply to the second slot. Since power is supplied to only a slot that is allocated an instruction, among a plurality of slots, and power is not supplied to a slot that is not allocated an instruction, power may be efficiently used.

Figure 6:
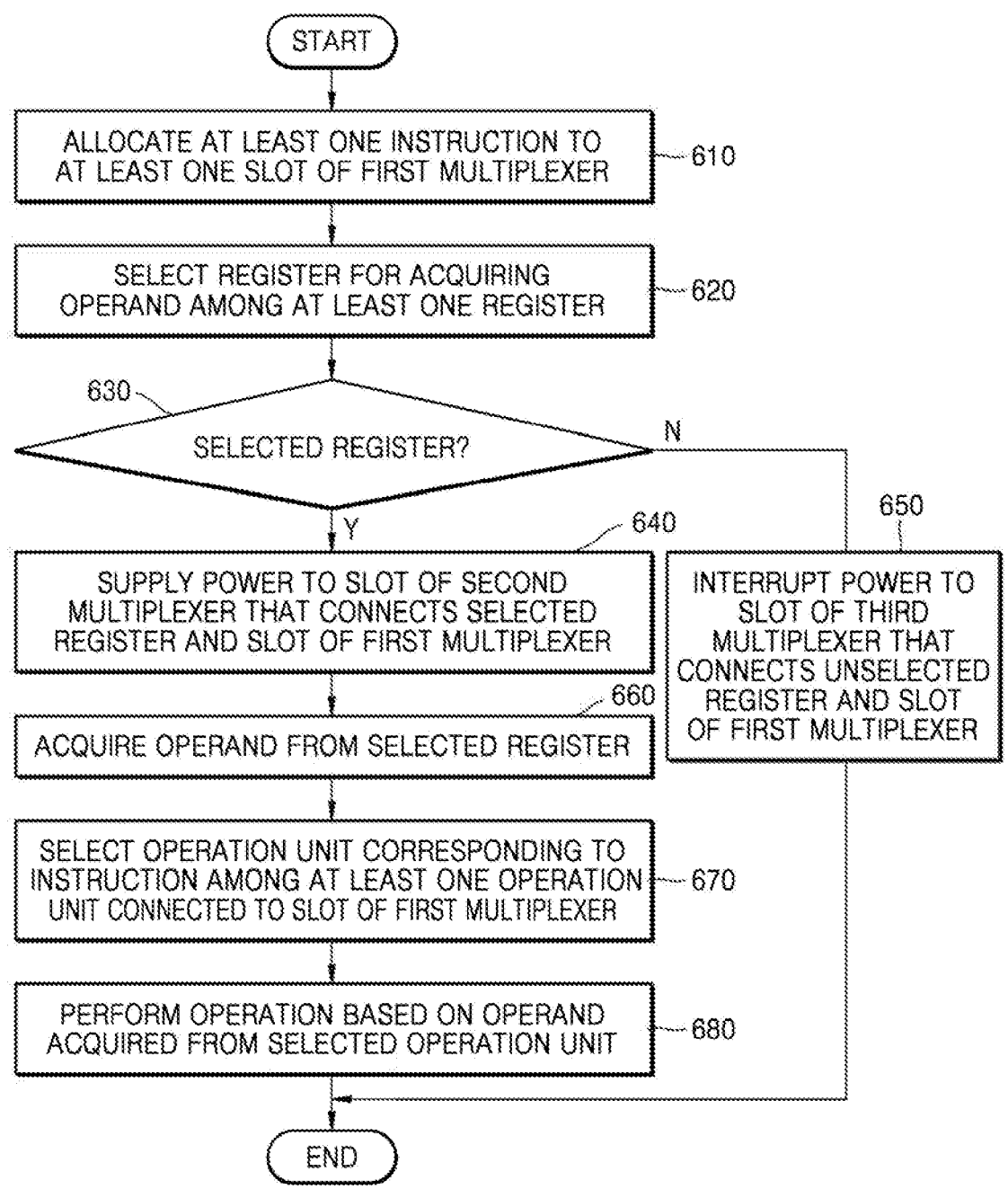
FIG. 6 is a flowchart illustrating a method for performing an operation based on an instruction according to an embodiment of the present invention.

FIG. 6 is a flowchart illustrating a method for performing an operation based on an instruction according to an embodiment of the present invention.

In operation 610, the processor 200 may allocate at least one instruction to at least one slot of the first multiplexer based on a type code extracted from at least one instruction. For example, when the first multiplexer includes four slots, the processor 200 may allocate a scalar instruction performing a scalar operation to the first slot and the second slot. Also, the processor 200 may allocate a vector instruction performing a vector operation to the third slot and the fourth slot.

In operation 620, the processor 200 may select a register for acquiring an operand among at least one register based on type information of an operand that is included in the type code. Herein, the operand may include scalar data or vector data.

In the case of a scalar instruction, an operand is scalar data. Thus, the processor 200 may select a scalar register storing scalar data. In the case of a vector instruction, an operand may be scalar data or vector data. For example, the vector instruction may include a first vector instruction processing only vector data as an operand and a second vector instruction processing both vector data and scalar data as an operand. Therefore, the processor 200 may identify a type of an operand processed in a predetermined vector instruction based on a type code representing type information of an operand.

In operation 630, the processor 200 may determine whether at least one register is selected.

In operation 640, the processor 200 may supply power to a slot of the second multiplexer that connects a selected register and the allocated slot of the first multiplexer. Herein, the second multiplexer may include a plurality of slots that may connect the selected register and at least one slot included in the first multiplexer.

In operation 650, the processor 200 may interrupt power supplied to a slot of the third multiplexer that connects an unselected register and the allocated slot of the first multiplexer. Herein, the third multiplexer may include a plurality of slots that may connect the unselected register and at least one slot included in the first multiplexer.

The processor 200 according to an embodiment of the present invention interrupts power supplied to the slot of the third multiplexer that is not used in an instruction execution process, thereby making it possible to efficiently use power.

In operation 660, the processor 200 may acquire an operation from the selected register. The processor 200 may acquire an operand from the selected register based on address information of an operand that is extracted from a predetermined instruction.

In operation 670, the processor 200 may select an operation unit corresponding to an instruction from among at least one operation units connected to the allocated slot of the first multiplexer. The processor 200 may extract an operation code included in a predetermined instruction, and select an operation unit based on the extracted operation code.

In operation 680, the processor 200 may perform an operation based on an operand acquired from the selected operation unit. Based on address information of a result value included in an instruction, the processor 200 may store a result value, which is generated by performing the operation, in a predetermined region of a memory that corresponds to address information.

FIG. 7 is a table illustrating a method for allocating an instruction to at least one slot included in the first multiplexer according to an embodiment of the present invention.

Referring to FIG. 7, a plurality of instructions output from the instruction queue 22, a stop bit included in each of the plurality of instructions, and information about a slot of the first multiplexer allocated according to the stop bit included in each of the plurality of instructions are included in the table of FIG. 7.

The instruction queue 22 may output a predetermined number of instructions in the same cycle simultaneously. For example, the instruction queue 22 may output four instructions simultaneously.

The instruction queue 22 may output a first scalar instruction, a second scalar instruction, a first vector instruction, and a second vector instruction that have stop bits 0, 0, 0, and 1, respectively. The processor 200 may allocate all of the four instructions to the slot of the first multiplexer based on the stop bits of the respective instructions. When the value of a stop bit of a predetermined instruction is 1, the processor 200 may execute the predetermined instruction in a current cycle and execute the subsequent instructions in a cycle after the current cycle. Therefore, among the four instructions having stop bits of 0, 0, 0, and 1 respectively, all instructions to the second vector instruction of the last order may be allocated to the slot of the first multiplexer.

In another example, the instruction queue 22 may output a first scalar instruction, a second scalar instruction, a first vector instruction, and an x instruction that have stop bits 0, 0, 1, and x, respectively. Herein, the case where the stop bit is x means the case of being 0 or 1. Also, the x instruction means the case where the instruction is a scalar instruction or a vector instruction.

After a time point when the stop bit has a value of 1, even when the stop bit has a value of 0 or 1, it may not affect determining an instruction output in the current cycle. That is because, when the stop bit of a predetermined instruction is 1, an instruction after the predetermined instruction is not executed in the current cycle.

The processor 200 may allocate the four instructions (that is, the first scalar instruction, the second scalar instruction, the first vector instruction, and the x instruction) that have stop bits 0, 0, 1, and x, respectively, to the slot of the first multiplexer.

In another example, the instruction queue 22 may output a first scalar instruction, a second scalar instruction, and two x instructions that have stop bits 0, 1, x, and x, respectively. The processor 200 may allocate the first scalar instruction and the second scalar instruction among the four instructions that have stop bits 0, 1, x, and x, respectively, to the slot of the first multiplexer.

In another example, the instruction queue 22 may output a first scalar instruction, a first vector instruction, a second vector instruction, and an x instruction that have stop bits 0, 0, 1, and x, respectively. The processor 200 may allocate the first scalar instruction, the first vector instruction, and the second vector instruction among the four instructions that have stop bits 0, 0, 1, and x, respectively, to the slot of the first multiplexer.

In another example, the instruction queue 22 may output a first scalar instruction, a first vector instruction, and two x instructions that have stop bits 0, 1, x, and x, respectively. The processor 200 may allocate the first scalar instruction and the first vector instruction among the four instructions that have stop bits 0, 1, x, and x, respectively, to the slot of the first multiplexer.

In another example, the instruction queue 22 may output a first scalar instruction and three x instructions that have stop bits 1, x, x, and x, respectively. The processor 200 may allocate the first scalar instruction among the four instructions that have stop bits 1, x, x, and x, respectively, to the slot of the first multiplexer.

In another example, the instruction queue 22 may output a first vector instruction, a second vector instruction, and two x instructions that have stop bits 0, 1, x, and x, respectively. The processor 200 may allocate the first vector instruction and the second vector instruction among the four instructions that have stop bits 0, 1, x, and x, respectively, to the slot of the first multiplexer.

In another example, the instruction queue 22 may output a first vector instruction and three x instructions that have stop bits 1, x, x, and x respectively. The processor 200 may allocate the first vector instruction among the four instructions that have stop bits 1, x, x, and x, respectively, to the slot of the first multiplexer.

Figure 8:
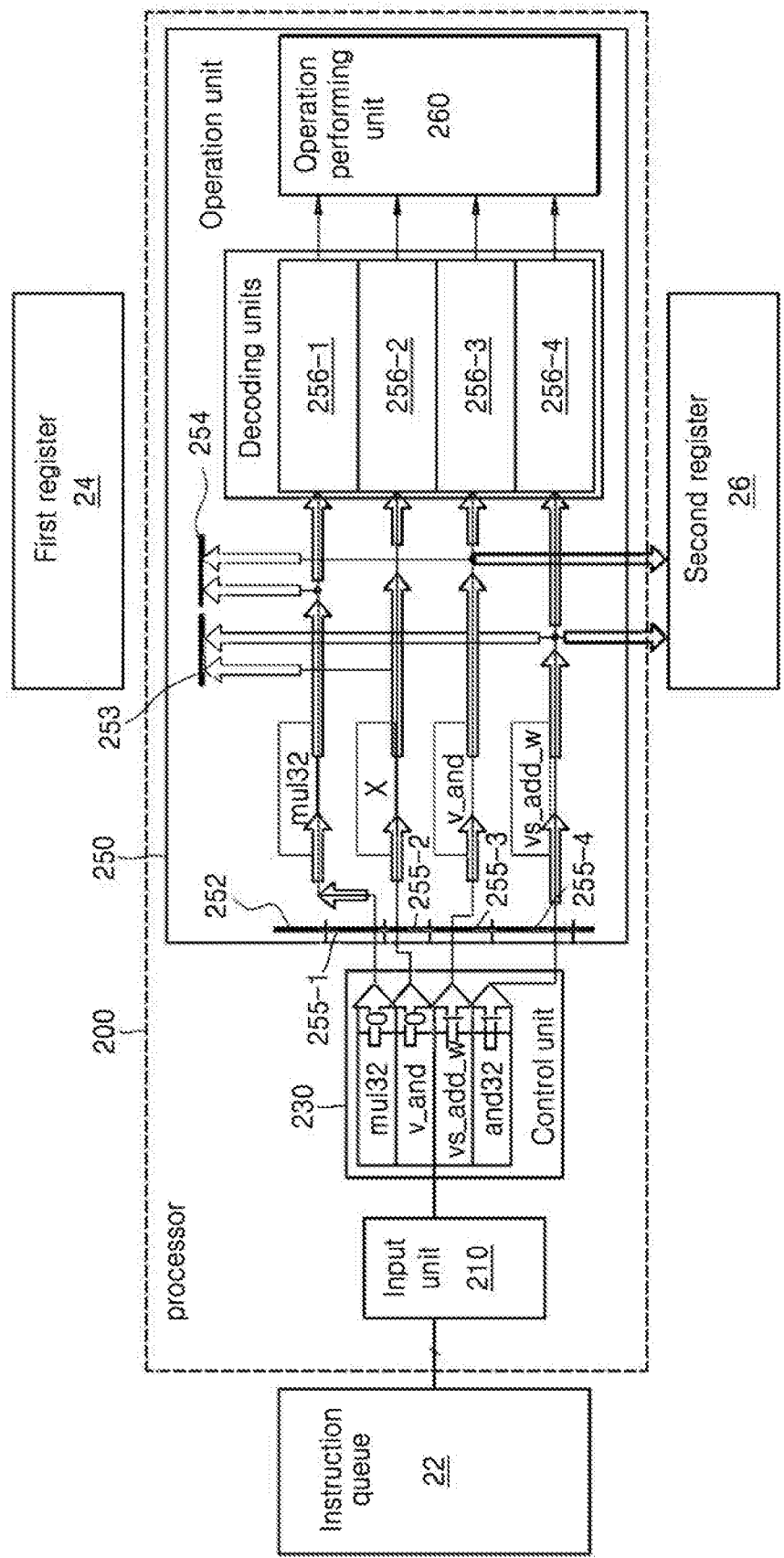
FIG. 8 is a diagram illustrating a method for executing at least one instruction in a processor according to an embodiment of the present invention.

FIG. 8 is a diagram illustrating a method for executing at least one instruction in the processor 200 according to an embodiment of the present invention. As shown in FIG. 8, the processor 200 includes an input unit (or input) 210, a control unit (or controller) 230, and an operation unit (or operator) 250.

The instruction queue 22 may include a plurality of instructions that are executable in the processor 200. Instructions may be stored in the instruction queue 22 based on the order of instructions generated by the instruction encoding apparatus 100.

The instruction queue 22 may output a predetermined number of instructions simultaneously. For example, when the predetermined number is 4, the instruction queue 22 may output four instructions simultaneously. In FIG. 8, the instruction queue 22 may output a first scalar instruction mul32, a first vector instruction v_and, a second vector instruction vs_add_w, and a second scalar instruction and32 simultaneously.

The stop bits of four instructions output from the instruction queue 22 are respectively 0, 0, 1, and 1. When the stop bit is 1, an instruction after the instruction having a stop bit of 1 may be executed in a next cycle following a current cycle. The processor 200 may execute the second vector instruction, in the stop bit of which 1 is first represented, among the four instructions output from the instruction queue 22, in a predetermined cycle. That is, the processor 200 may execute the first scalar instruction, the first vector instruction, and the second vector instruction in the predetermined cycle.

The processor 200 may acquire the first scalar instruction, the first vector instruction, and the second vector instruction from the instruction queue 22. The processor 200 may allocate each instruction to at least one slot of a first multiplexer 252 based on a type code included in each instruction acquired. Herein, the first multiplexer 252 may include four slots, 255-1 through 255-4, for example. The processor 200 may allocate a scalar instruction performing a scalar operation to a first slot 255-1 and a second slot 255-2 among the four slots. Also, the processor 200 may allocate a vector instruction performing a vector operation to a third slot 255-3 and a fourth slot 255-4 among the four slots. For example, the processor 200 may allocate the first scalar instruction to the first slot 255-1. Also, the processor 200 may allocate the first vector instruction to the third slot 255-3 and allocate the second vector instruction to the fourth slot 255-4.

The processor 200 may perform an operation by analyzing an operation code, an address code of an operand, and an address code of a result value that are included in the instruction allocated to each of the slots 255-1, 255-3, and 255-4.

The processor 200 may select registers 24 and 26 for acquiring an operand from among at least one register based on type information of an operand that is included in a predetermined instruction. In particular, in the case of a vector instruction that may process both scalar data and vector data as an operand, the processor 200 may select at least one of the scalar register 24 storing scalar data and the vector register 26 storing vector data.

For example, the processor 200 may execute the first vector instruction that processes only vector data as an operand. Referring to FIG. 8, the first vector instruction may be allocated to the third slot 255-3. First, the processor 200 may connect the third slot 255-3 and the vector register 26 in order to execute the first vector instruction. Since the first vector instruction does not need a scalar operand, the processor 200 may interrupt power supply to a third multiplexer 254 that connects the scalar register and the third slot 255-3.

In another example, the processor 200 may execute the second vector instruction that processes both vector data and scalar data as an operand. Referring to FIG. 8, the second vector instruction may be allocated to the fourth slot. First, the processor 200 may connect the fourth slot and the vector register in order to execute the second vector instruction. Since the second vector instruction needs a scalar operand unlike the first vector instruction, the processor 200 may connect the scalar register and the fourth slot. The processor 200 according to the embodiment of the present invention may supply power to the second multiplexer 253 to connect the scalar register and the fourth slot 255-4. The processor 200 may transmit the respective instructions allocated to the respective slots 255-1, 255-2, 255-3, and 255-4, to decoding units 256-1, 256-2, 256-3, and 256-4 corresponding to the respective slots 255-1, 255-2, 255-3, and 255-4. For example, the processor 200 may transmit the first instruction allocated to the first slot 255-1, to the first scalar instruction decoding unit 256-1 corresponding to the first slot 255-1. The first scalar instruction decoding unit 256-1 may analyze an operation code included in the first scalar instruction and transmit the first scalar instruction to an operation performing unit 260 corresponding to the first scalar instruction.

According to an embodiment of the present invention, the operation performing unit 260 may analyze operation codes included in respective instructions included in the decoding units 256-1, 256-2, 256-3, and 256-4, and perform operations corresponding to the respective instructions. Herein, the operation performing unit 260 may include units that may perform various operations. The respective units included in the operation performing unit 260 may perform the operations corresponding to the respective instructions received from the decoding units 256-1, 256-2, 256-3, and 256-4.

Figure 9:
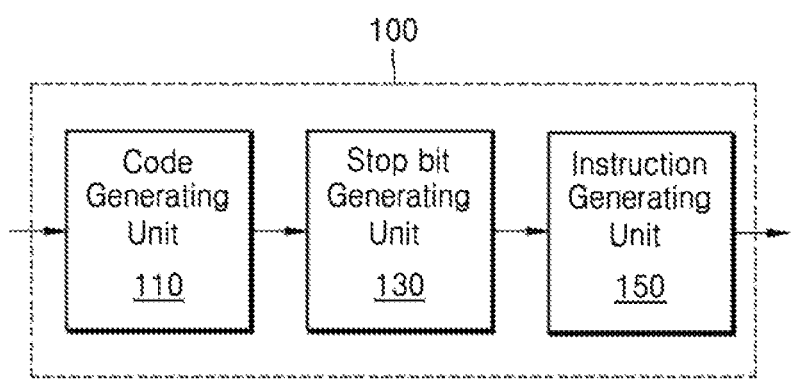
FIG. 9 is a block diagram of an apparatus for encoding instructions according to an embodiment of the present invention.

FIG. 9 is a block diagram of an instruction encoding apparatus 100 according to an embodiment of the present invention.

In FIG. 9, only components related to the present embodiment are illustrated. Therefore, those or ordinary skill in the art will understand that the instruction encoding apparatus 100 may further include other general-purpose components in addition to the components illustrated in FIG. 9.

Referring to FIG. 9, the instruction encoding apparatus 100 may include a code generating unit 110, a stop bit generating unit 130, and an instruction generating unit 150.

The code generating unit 110 may generate a type code including type information of a predetermined operation that is performable in a processor and type information of an operand that is processed in the predetermined operation. Herein, the operation may be a scalar operation or a vector operation. Also, the operand may include scalar data or vector data.

An instruction according to an embodiment of the present invention may include 32 bits. Information about the type of the operation may be represented by the 32nd bit of the 32-bit instruction. However, this is merely an embodiment of the present invention, and the information about the type of the operation is not limited to being represented in the 32nd bit. For example, the information about the type of the operation may be represented in two or more bits, and the information about the type of the operation may be represented in a bit other than the 32nd bit.

According to an embodiment of the present invention, information about the type of the operand may be represented by a predetermined number of bits of the 32-bit instruction. When the operation performed by the instruction is a scalar operation, the operand may be scalar data. When the operation performed by the instruction is a vector operation, the operand may include only vector data or may include both vector data and scalar data.

The stop bit generating unit 130 may generate a stop bit including information about at least one operation performed in a predetermined cycle.

When the second instruction that is a next instruction following the first instruction is executed in the predetermined cycle, the stop bit generating unit 130 may represent a first value, for example, 0, in the stop bit. When the second instruction is executed in a next cycle following the predetermined cycle, the stop bit generating unit 130 may represent a second value, for example, 1, in the stop bit.

For example, the maximum number of instructions that are simultaneously executable in the VLIW processor according to an embodiment of the present invention may be 4. When the stop bit included in each of four instructions is 0011, three operations may be performed in the predetermined cycle. In detail, among the four instructions, that is, an (m)th instruction, an (m+1)th instruction, an (m+2)th instruction, and an (m+3)th instruction, the instruction having a stop bit value of 1 first is the (m+2)th instruction. In this case, the (m+3)th instruction that is a next instruction following the (m+2)th instruction may be executed in a next cycle following the predetermined cycle, and the (m)th instruction, the (m+1)th instruction, and the (m+2)th instruction may be executed in the predetermined cycle.

The instruction generating unit 150 may generate an instruction for performing a predetermined operation based on the type code and the stop bit.

The instruction generating unit 150 may generate an instruction by arranging the type code and the stop bit according to a predetermined structure of the instruction. Herein, the instruction may include an operation code, an address code of an operand processed based on the operation code, and an address code of a result value that stores an operation result. Detailed information included in the instruction, for example, a code performing a predetermined function, may vary according to an operation performed by the instruction.

Figure 10:
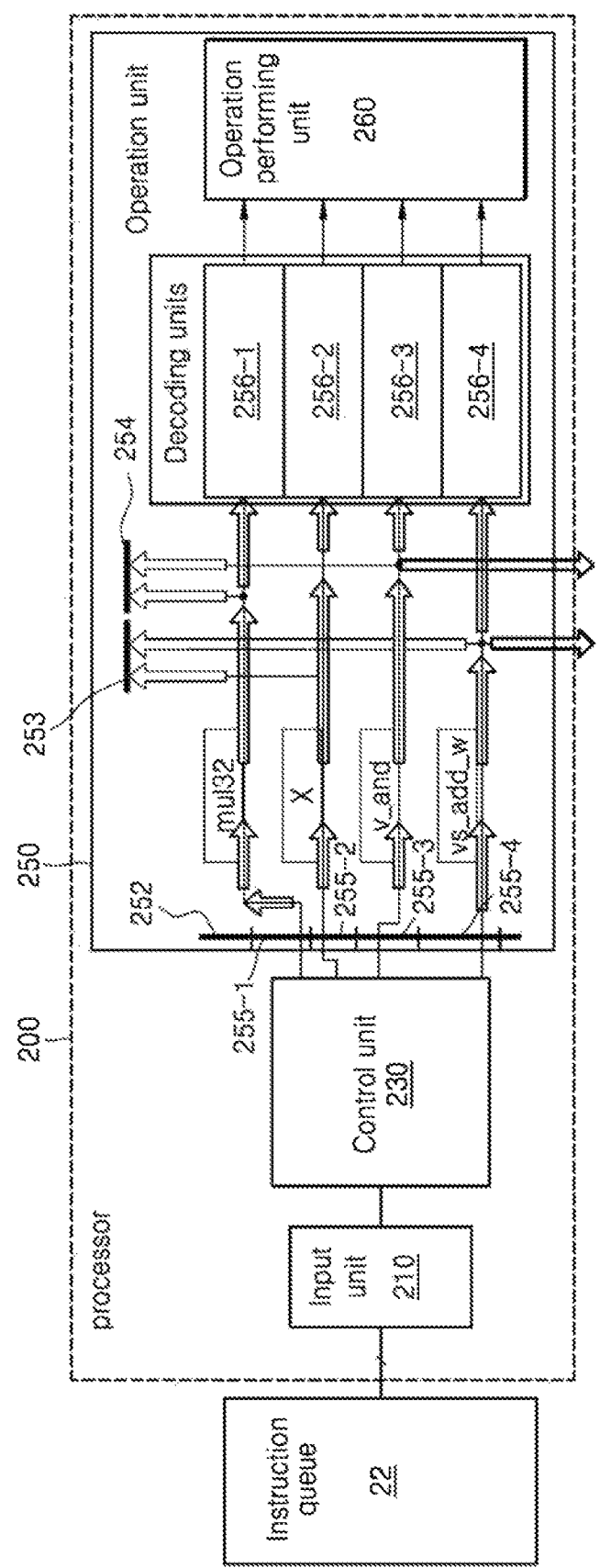
FIG. 10 is a block diagram of a processor according to an embodiment of the present invention.

FIG. 10 is a block diagram of a processor 200 according to an embodiment of the present invention.

In FIG. 10, only components related to the present embodiment are illustrated. Therefore, those or ordinary skill in the art will understand that the processor 200 may further include other general-purpose components in addition to the components illustrated in FIG. 10.

Referring to FIG. 10, the processor 200 may include an input unit 210, a control unit 230, and an operation unit 250.

The input unit 210 may acquire, based on a stop bit included in each of a plurality of instructions, at least one instruction executed in a predetermined cycle. According to an embodiment of the present invention, the input unit 210 may acquire at least one instruction in a predetermined cycle, based on a stop bit included in each of a plurality of instructions received from the instruction queue 22. Herein, the instruction queue 22 may output a predetermined number of instructions in each cycle.

When the stop bit included in the first instruction received by the input unit 210 has a first value, for example, 0, the input unit 210 may acquire the second instruction, which is a next instruction following the first instruction, in the predetermined cycle. Herein, the next instruction may be determined based on the order of storing a plurality of instructions in the instruction queue 22. That is, when the first instruction and the second instruction are sequentially stored in the instruction queue 22, the second instruction may be a next instruction following the first instruction.

When the stop bit included in the first instruction received by the input unit 210 has a second value, for example, 1, the input unit 210 may acquire the second instruction, which is a next instruction following the first instruction, in a next cycle following the predetermined cycle. That is, when the stop bit has the second value, the input unit 210 may acquire the first instruction in the predetermined cycle and acquire the second instruction in the next cycle.

The control unit 230 may extract a type code from at least one instruction, the type code including type information of an operation performed based on at least one instruction acquired by the input unit 210. Herein, the operation may be a scalar operation or a vector operation.

The control unit 230 may identify operation type information included in the extracted type code. For example, in the case of an instruction representing a type of an operation by the 32nd bit, when the value of the 32nd bit is 0, the control unit 230 may identify the operation as a scalar operation. Also, when the value of the 32nd bit is 1, the control unit 230 may identify the operation as a vector operation.

According to an embodiment of the present invention, the control unit 230 may allocate at least one instruction to at least one slot of the first multiplexer 252 based on the extracted type code. For example, when the first multiplexer 252 includes four slots, the control unit 230 may allocate a scalar instruction performing a scalar operation to the first slot 255-1 and the second slot 255-2. Also, the control unit 230 may allocate a vector instruction performing a vector operation to the third slot 255-3 and the fourth slot 255-4.

The operation unit 250 may perform an operation in the allocated slot. In detail, in order to perform an operation in the allocated slot, the operation unit 250 may supply power to a slot that is allocated an instruction, from among at least one slot of the first multiplexer 252. For example, since instructions are allocated to the first slot 255-1, the third slot 255-3, and the fourth slot 255-4 among the four slots, the operation unit 250 may supply power to the first slot 255-1, the third slot 255-3, and the fourth slot 255-4.

On the other hand, the operation unit 250 may interrupt power supplied to the slot other than the slot that is allocated an instruction, from among at least one slot of the first multiplexer 252. For example, when an instruction is not allocated to the second slot 255-2 from among the four slots, the operation unit 250 may interrupt power supplied to the second slot 255-2. Since power is supplied to only a slot that is allocated an instruction, from among a plurality of slots, and power is not supplied to a slot that is not allocated an instruction, power may be efficiently used.

The operation unit 250 may select a register for acquiring an operand among at least one register based on type information of an operand that is included in the type code. Herein, the operand may include scalar data or vector data.

In the case of a scalar instruction, an operand is scalar data. Thus, the operation unit 250 may select a scalar register storing scalar data. In the case of a vector instruction, an operand may be scalar data or vector data. For example, the vector instruction may include a first vector instruction processing only vector data as an operand and a second vector instruction processing both vector data and scalar data as an operand. Therefore, the operation unit 250 may identify a type of an operand processed in a predetermined vector instruction based on a type code representing type information of an operand.

The operation unit 250 according to an embodiment of the present invention may supply power to a slot of the second multiplexer 253 that connects a selected register and the allocated slot of the first multiplexer 252. Herein, the second multiplexer 253 may include a plurality of slots that may connect the selected register and at least one slot included in the first multiplexer 252.

The operation unit 250 may interrupt power supply power a slot of the third multiplexer 254 that connects an unselected register and the allocated slot of the first multiplexer 252. Herein, the third multiplexer 254 may include a plurality of slots that may connect the unselected register and at least one slot included in the first multiplexer 252. The operation unit 250 interrupts power supplied to the slot of the third multiplexer 254 that is not used in an instruction execution process, thereby making it possible to efficiently use power.

The operation unit 250 may acquire an operation from the selected register. In detail, the operation unit 250 may acquire an operand from the selected register based on address information of an operand that is extracted from a predetermined instruction.

The operation unit 250 may select a unit that may execute an instruction in the operation performing unit 260 (see FIG. 8) connected to the allocated slot of the first multiplexer 252. Herein, the operation performing unit 260 may include at least one unit that may perform operations corresponding to respective instructions. Also, referring to FIG. 8, the operation performing unit 260 may be included in the operation unit 250. However, this is merely an embodiment of the present invention, and the operation performing unit 260 may be located outside the operation unit 250.

The operation unit 250 may extract an operation code included in a predetermined instruction, and select the unit included in the operation performing unit 260 based on the extracted operation code. The unit selected in the operation performing unit 260 may perform an operation based on the acquired operand. Based on address information of a result value included in an instruction, the operation unit 250 may store a result value, which is generated by performing the operation, in a predetermined region of a memory that corresponds to address information.

The apparatus according to the embodiment of the present invention may include a processor, a memory for storing and executing program data, a permanent storage such as a disk drive, a communication port for communicating with an external device, and user interface (UI) devices such as a touch panel, keys, and buttons. Methods implemented by a software module or algorithm may be stored on a computer-readable recording medium as computer-readable codes or program commands that are executable on the processor. Examples of the computer-readable recording medium include magnetic storage media (for example, read-only memories (ROMs), random-access memories (RAMs), floppy disks, and hard disks) and optical recording media (for example, compact disk-read only memories (CD-ROMs) and digital versatile disks (DVDs)). The computer-readable recording medium may also be distributed over network-coupled computer systems so that the computer-readable codes may be stored and executed in a distributed fashion. The computer-readable recording medium is readable by a computer, and may be stored in a memory and executed in a processor.

All references, including publications, patent applications, and patents, cited herein are hereby incorporated by reference to the same extent as if each reference is individually and specifically indicated to be incorporated by reference and is set forth in its entirety herein.

For the purposes of promoting an understanding of the concept of the present invention, reference has been made to the exemplary embodiments illustrated in the drawings, and particular terms have been used to describe the embodiments of the present invention. However, the scope of the present invention is not limited by the particular terms, and the present invention may encompass all elements that may be generally conceived by those of ordinary skill in the art.

The embodiments of the present invention may be described in terms of functional block components and various processing operations. Such functional blocks may be implemented by any number of hardware and/or software components that execute particular functions. For example, the embodiments of the present invention may employ various integrated circuit (IC) components, such as memory elements, processing elements, logic elements, and lookup tables, which may execute various functions under the control of one or more microprocessors or other control devices. Similarly, where the elements of the present invention are implemented by software programming or software elements, the embodiments of the present invention may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the embodiments of the present invention may employ the related art for electronic environment setting, signal processing, and/or data processing. Terms such as "mechanism," "element," "unit," and "configuration" may be used in a broad sense and are not limited to mechanical and physical configurations. The terms may include the meaning of software routines in conjunction with processors or the like.

Particular implementations described herein are merely exemplary, and do not limit the scope of the present invention in any way. For the sake of conciseness, descriptions of related art electronic configurations, control systems, software, and other functional aspects of the systems may be omitted. Also, the connection lines or connection members illustrated in the drawings represent exemplary functional relationships and/or physical or logical connections between the various elements, and various alternative or additional functional relationships, physical connections, or logical connections may be present in a practical apparatus. Also, no element may be essential to the practice of the embodiments of the present invention unless the element is specifically described as "essential" or "critical".

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method to execute instructions in a processor, comprising:

acquiring from an instruction queue including a plurality of instructions, based on a stop bit included in each of the plurality of instructions, at least one instruction from the instruction queue;

extracting, from the at least one instruction, a type code including type information of an operation performed based on the at least one instruction and type information of an operand which is processed in the operation, wherein the type information of the operation comprises a scalar operation or a vector operation and the type information of the operand comprises scalar data or vector data;

allocating the at least one instruction to at least one slot of a plurality of slots associated with a first multiplexer based on the type information of the operation, wherein each of the plurality of slots obtain an instruction from the instruction queue;

selecting a register to acquire the operand from among at least one register based on the type information of the operand;

acquiring the operand from the selected register;

supplying a power to the at least one slot to which the at least one instruction is allocated and to a slot, associated with a second multiplexer, that connects the selected register and the at least one slot associated with the first multiplexer based on the type code;

interrupting power to a slot other than the at least one slot to which the at least one instruction is allocated from among the plurality of slots associated with the first multiplexer, and to a slot, associated with a third multiplexer, that connects an unselected register among the at least one register and the at least one slot associated with the first multiplexer based on the type code; and performing the operation based on the at least one instruction allocated in the at least one slot.

2. The method of claim 1, wherein the acquiring of the at least one instruction comprises:

acquiring, from the instruction queue, a second instruction, which is a next instruction following a first instruction of the at least one instruction, in a predetermined cycle when a stop bit included in the first instruction has a first value; and acquiring, from the instruction queue, the second instruction in a next cycle following the predetermined cycle when the stop bit included in the first instruction has a second value.

3. The method of claim 1, wherein the operation is performed by:

selecting an operation performing unit performing the operation from among at least one operation performing unit connected to the first multiplexer; and performing the operation in the selected operation performing unit based on the acquired operand.

4. The method of claim 1, wherein the processor is a very long instruction word (VLIW) processor.

5. A processor to execute instructions, comprising:

an input unit configured to acquire, from an instruction queue including a plurality of instructions, based on a stop bit included in each of the plurality of instructions, at least one instruction from the instruction queue;

a control unit configured to extract from the at least one instruction a type code comprising type information of an operation performed based on the at least one instruction and type information of an operand which is processed in the operation, wherein the type information of the operation comprises a scalar operation or a vector operation and the type information of the operand comprises scalar data or vector data, allocate the at least one instruction to at least one slot of a plurality of slots associated with a first multiplexer based on the type information of the operation, wherein each of the plurality of slots obtain an instruction from the instruction queue;

select a register to acquire the operand from among at least one register based on the type information of the operand;

acquire the operand from the selected register; and an operation unit configured to supply power to the at least one slot to which the at least one instruction is allocated and to a slot, associated with a second multiplexer, that connects the selected register and the at least one slot associated with the first multiplexer based on the type code, interrupt power to a slot other than the at least one slot to which the at least one instruction is allocated from among the plurality of slots associated with the first multiplexer, and to a slot, associated with a third multiplexer, that connects an unselected register among the at least one register and the at least one slot associated with the first multiplexer based on the type code, and perform the operation based on the at least one instruction allocated in the at least one slot.

6. The processor of claim 5, wherein the input unit acquires, from the instruction queue, a second instruction which is a next instruction following a first instruction of the at least one instruction in the predetermined cycle when a stop bit included in the first instruction has a first value, and acquires, from the instruction queue, the second instruction in a next cycle following the predetermined cycle when the stop bit included in the first instruction has a second value.

7. The processor of claim 5, the operation unit selects an operation performing unit performing the operation among at least one operation performing unit connected to the first multiplexer, and performs the operation in the selected operation performing unit based on the acquired operand.

8. The processor of claim 5, wherein the processor is a very long instruction word (VLIW) processor.

9. A non-transitory computer-readable recording medium that stores a program that, when executed by a computer, performs the method of claim 1.

* * * * *